Figure 1:
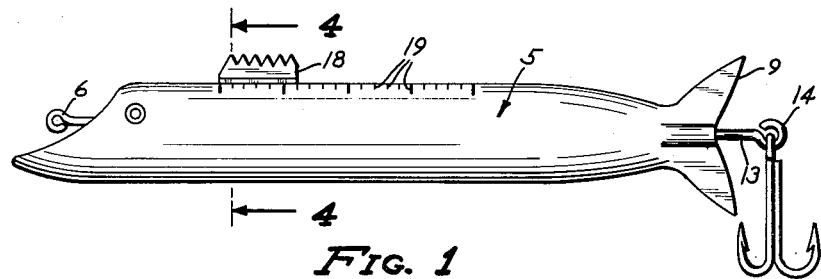

Oct. 31, 1961   L. H. CHAPMAN   3,006,102
ARTIFICIAL FISHING LURE
Filed Nov. 6, 1958

INVENTOR.
LOYAL H. CHAPMAN
BY
*David K. Kilgore*
ATTORNEY

United States Patent Office 3,006,102
Patented Oct. 31, 1961

3,006,102
ARTIFICIAL FISHING LURE
Loyal H. Chapman, 9021 Club Road, Minneapolis, Minn.
Filed Nov. 6, 1958, Ser. No. 772,263
1 Claim. (Cl. 43—42)

This invention relates broadly to fishing tackle; more particularly to an artificial lure that simulates a minnow and is of the type of lure used for trolling and casting. Specifically the invention consists of an artificial fishing lure having means, whereby when the lure is struck by a fish in angling procedure, the pull of said fish on the terminal tackle is indicated on a scale which forms a part of the artificial lure.

It will be understood that while the invention is intended for general use and amusement in angling to indicate the strike or pull of a fish on the said terminal tackle, the invention is primarily intended to indicate to the angler, the size of the fish "that got away."

The principal object of the invention is to provide an artifical fishing lure that will indicate to the angler the approximate size of a hooked fish that is not landed.

Another object of the invention is to provide an artificial fishing lure having an integral scale having graduations to indicate weight or pull or a combination of each thereof.

Another object of the invention is to provide an artificial fishing lure having an integral scale that will indicate the approximate size or weight of a caught fish and continue to register said weight or the pull of a strike after the fish has freed itself of said lure.

A further object of the invention is to provide an artificial fishing lure having an integral scale that in no way interferes with the life like action of the lure when used for casting or trolling and which may easily and inexpensively be embodied in the conventional, minnow like artificial lure by its manufacturer.

A still further object of the invention is to provide an artificial fishing lure having cushion means to lessen the strain on the terminal tackle in the event of a sudden heavy strike of a fish or snagging on an underwater obstruction.

These and other objects of the invention will become apparent from the following specification and claim taken in conjunction with the appended drawings, and in which drawings, like characters indicate like parts throughout the several views.

To the above end, generally stated, the invention consists of the following devices and combination of devices hereinafter described, and defined in the claim.

Figure 2:
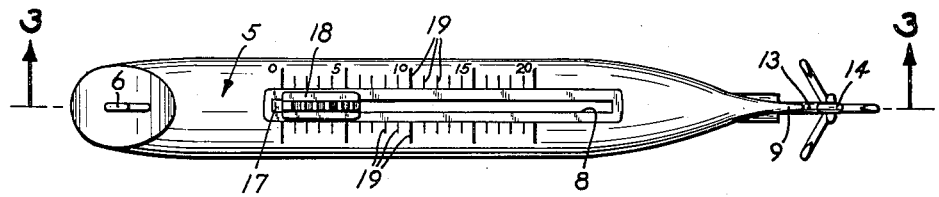
Figure 3:
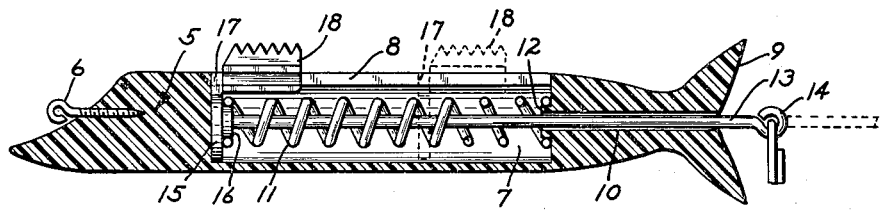
Figure 4:
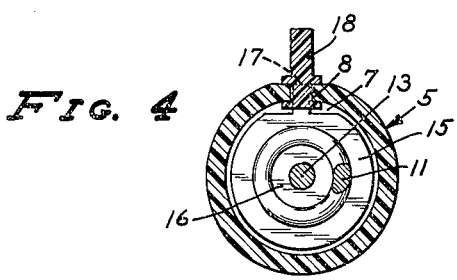

Referring to the drawings:

FIG. 1 is a side elevational view of an artificial fishing lure with the invention installed thereon, FIG. 2 is a top plan view of the same, FIG. 3 is a longitudinal section of the artificial lure taken along the line 3—3 of FIG. 2, and FIG. 4 is a transverse section of the same taken along the lines 4—4 of FIG. 1.

Referring now in detail to the drawings, the numeral 5 is directed to the body portion of the artificial fishing lure which as shown, has the general configurations of a bait minnow having a closed screw-eye 6 attached to its forward end portion to which the leader and line are connected.

A hollow chamber 7 is formed in substantially the longitudinal center of the body 5 and has communication with water or atmosphere via a relatively narrow, longitudinally disposed slot 8. Said slot being formed and extending through the upper surface of the body 5 at the longitudinal center thereof when the lure is viewed in normal swimming position.

Extending rearwardly from the chamber 7 along the longitudinal axis of the body 5 and into communication with the atmosphere at the tail portion 9 of the lure, is a relatively narrow bore 10 which affords a passageway for a long eye-bolt as will presently be described.

A coiled spring 11 is mounted in the chamber 7 and is held positioned therein at its rear end portion on an annular shoulder 12 formed in the rear end portion of said chamber, the most rearwardly convolution of the spring 11 being constructed and arranged to encircle the said annular shoulder 12 and abut the rear end wall of the chamber 7 as a base of resistance.

A long bolt 13 having an eye 14 formed in its outer end portion extends through the bore 10 in the tail portion 9 of the lure and axially through the coiled spring 11 and into rigid engagement with a relatively heavy disc 15 that is mounted for endwise movements in the chamber 7 of the body 5. The disc 15 is provided on its rear surface with an annular shoulder 16 similar to the shoulder 12 and is mounted in said chamber, forwardly of the forwardmost convolution of the spring 11, which also encircles this shoulder.

It will thus be seen that normally the spring 11 is held slightly compressed in the chamber 7 between the respective rear inner face of the chamber 7 and the forwardly mounted disc 15 and centrally positioned in said chamber by engagement of the respective end convolution of the spring and the respective annular shoulders 12 and 16. An upstanding lug 17 is formed integral with the disc 15 and is projected upwardly into the longitudinally disposed slot 8, said lug being transversely dimensioned to a close working fit with said slot.

An indicating finger piece 18 which simultates the dorsal fin of a fish is permanently mounted in the slot 8 for endwise movements with a relatively close frictional fit, with the body surrounding said slot, and is manipulated by the fingers of the angler to position or re-set the same for use in angling procedures as will presently be described.

The upstanding lug 17 on the disc 15 extends as described through the slot 8 and is normally held positioned at the extreme forward end portion of the slot 8 by the outward expansion of the slightly tensioned spring 11. To set the invention for use in angling procedures it is only necessary to manually urge the finger piece 18 into endwise abutting engagement with the lug 17 where the same will remain positioned under normal circumstances by its frictional engagement with the body portion 5 surrounding the slot 8.

A treble gang hook is attached to the eye 14 of the bolt 13 and when a fish strikes said hook and is either caught or releases itself, the rearward pull of the hooked fish will cause the bolt 13 and its connected disc 15 to move rearwardly against spring tension and the integral lug 17 on the disc 15 will urge the indicating finger piece 18 rearwardly in the slot 8 to the point of the greatest tension or pull on the terminal tackle. If tension is released at this point by the loss of the fish, the hook, eyebolt and disc assembly will be returned to normal position by expansion of the spring 11, but the finger piece 18 will remain in the slot at the point of greatest tension. Obviously when the terminal tackle is retrieved for examination, the indicating finger piece must be manually re-set before commencing another casting or trolling procedure.

A series of calibrations 19 are shown adjacent to the slot 8 on the outer surface of the body 5 and are intended to make it possible for the angler to transpose the point of maximum pull into pounds weight, however, it will be understood that such calibrations are of an arbitrary nature.

It is also important to note that the embodiment of the principle of spring tension between the fishing line and the terminal tackle is highly regarded by some anglers for some types of angling as a means for lessening the strain on the lines and tackle in the event of a heavy sudden strike of a large fish or the snagging of the tackle on an underwater obstruction. Hence, the invention serves a dual purpose in being both entertaining and functional.

While there are herein disclosed but a limited number of embodiments of the structure, process and produce of the invention herein presented, it is possible to produce still other embodiments without departing from the inventive concept herein disclosed, and it is desired, therefore, that only such limitations be imposed on the appended claim as are stated herein or required by the prior art.

What I claim is:

An artificial fishing lure comprising in combination, an elongated body simultating a natural bait minnow, said body member having a head portion, a body portion having a hollow chamber and a longitudinally disposed slot, and a tail portion, an eye bolt mounted in the said head portion to connect the lure to terminal fishing tackle including a leader and a line, there being a relatively narrow axial bore in said body portion extending rearwardly from the chamber and outwardly of the lure through the said tail portion, a coiled spring mounted in said chamber and a long eye-bolt extending through said axial bore and the coiled spring in the chamber to the forward end portion thereof, a disc-like member rigidly secured to the forward end portion of the eye-bolt and being of slightly larger diameter than the spring, said spring being held slightly compressed between the disc and the rear end portion of the chamber, said slot being in communication with the hollow chamber, a plurality of graduations adjacent said slot to afford indicating indicia, a free movable member frictionally mounted in said slot for endwise movements therein, means associated with the disc and eye-bolt to impart rearward movement to said free movable member, said member remaining at its most rearwardly position in the slot when tension on the spring is released, a fish hook secured to the outer end portion of the eye-bolt whereby the force of the strike of a fish thereon will impart the initial rearward movement to the disc and eye-bolt and the free movable member.

References Cited in the file of this patent

UNITED STATES PATENTS

| | | |
|---|---|---|
| 629,290 | Goodbaudy | July 18, 1899 |
| 2,147,917 | Noren | Feb. 21, 1939 |
| 2,794,287 | Mancusi | June 4, 1957 |

OTHER REFERENCES

Washington Sunday Star Comic entitled "Kitty Higgins," dated Sept. 10, 1939.